Feb. 25, 1964   M. B. HOLLANDER ETAL   3,121,948
FRICTION WELDING
Filed March 29, 1961

INVENTORS
MILTON BERNARD HOLLANDER
MICHAEL FRANCIS CAMPS-CAMPINS
BY
William A. Drucker
ATTORNEY

United States Patent Office 3,121,948
Patented Feb. 25, 1964

3,121,948
FRICTION WELDING
Milton Bernard Hollander, Teaneck, N.J., and Michael Francis Camps-Campins, Norwalk, Conn., assignors to American Machine & Foundry Company, a corporation of New Jersey
Filed Mar. 29, 1961, Ser. No. 99,190
14 Claims. (Cl. 29—470.3)

This invention relates in general to friction welding and brazing and, more particularly, to the friction welding and brazing of dissimilar or incompatible combinations of materials as well as similar, but difficult to weld, materials.

When metals, such as aluminum and stainless steel, are conventionally friction welded, the resulting high pressures and temperatures applied in the weld area may cause the aluminum workpiece to crack adjacent to the weld area. Also there may be excessive upset or displacement of aluminum because of its weaker hot strength. Furthermore, materials of different melting temperatures, conductivities, diffusivities or other properties may be difficult to weld and brittle materials may crack, chip or spall in conventional friction welding. It is, therefore, an object of this invention to provide a method for friction welding or brazing materials which could not heretofore satisfactorily be friction welded.

Another object of this invention is to provide a process whereby aluminum may be satisfactorily friction welded to steel, stainless steel may be friction welded to molybdenum, zirconium may be welded to steel or stainless steel, Monel may be friction welded to aluminum, and other dissimilar metals may be joined.

A further feature of this invention is the friction welding of workpieces of dissimilar materials by interposing between the workpeices a thin layer plating or sheet of a material soluble in both dissimilar materials and preferably of intermediate melting point, so that the resulting weld has an area in which the interposed thin layer may not remain in the pure state but is alloyed or dispersed within the dissimilar materials of the welded workpieces.

Still a further feature of this invention is the bonding of ceramics to metallics by flame spraying an intermediate ceramic surface onto the contacting end of metal bar and using the built up ceramic area as the welding surface for joining a second ceramic workpiece, i.e., aluminum oxide, to the first metal workpiece.

Figure 1:
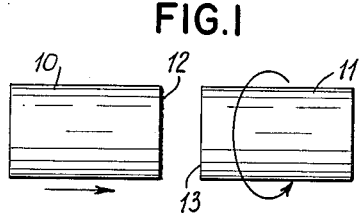
Figure 2:
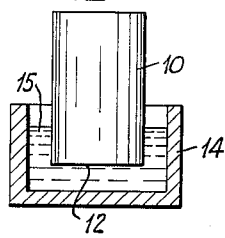
Figure 3:
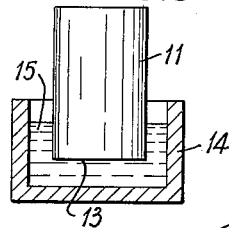
Figure 4:
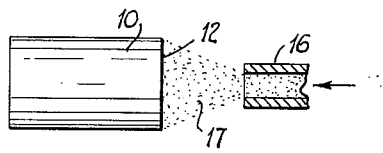
Figure 5A:
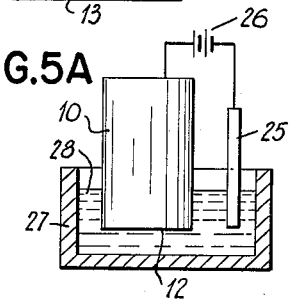
Figure 5:
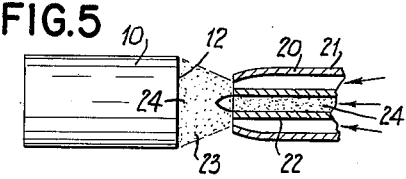
Figure 5B:
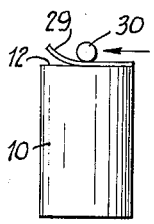
Figure 7:
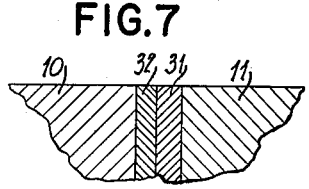
Figure 6:

Many other objects, advantages and features of invention reside in the practice of this invention as will be understood from the following description and accompanying drawing wherein:

FIG. 1 is a side view of two workpieces prior to being friction welded;
FIGS. 2 and 3 show two workpieces being degreased prior to friction welding;
FIG. 4 shows a face of one workpiece being sandblasted;
FIG. 5 shows the sandblasted face of a workpiece being flame coated or spattered;
FIG. 5A shows the sandblasted surface of a workpiece being electroplated;
FIG. 5B shows the sandblasted surface of a workpiece being foil coated;
FIG. 6 shows two friction welded workpieces; and
FIG. 7 is an enlarged longitudinal section through the weld zone of two workpieces showing the structure in the weld area.

Referring to the drawing in detail, according to a preferred embodiment, if a stainless steel workpiece 10 is to be joined to an aluminum workpiece 11, these workpieces 10 and 11 are prepared in the following manner. As shown in FIGS. 2 and 3, the surfaces 12 and 13 of the workpieces 10 and 11 should be degreased or cleaned by immersing them in a tank 14 of a suitable degreasing fluid 15 such as benzene. The surfaces 12 and 13 may also be degreased by ultrasonic means or in any other suitable manner.

As shown in FIG. 4, the degreased surface 12 of the stainless steel workpiece 10 is then roughened by a suitable sandblasting apparatus 16, for example, for the purpose of flame spraying. The sandblasting apparatus 16 should sandblast the surface 12 of the stainless steel workpiece 10 with particles 17 of chilled iron or aluminum oxide, such as S.A.E. No. 15 to 25 grit size.

As shown in FIGS. 5, 5A and 5B, the stainless steel workpiece 10 is further prepared for friction welding by any of several methods. Referring to FIG. 5, a spattering apparatus 20 terminates in the two concentric tubes 21 and 22. A reducing flame 23 is formed as combustible gases ignite after being forced from the front of the spattering apparatus 20 between the concentric tubes 21 and 22. Small particles of nickel 24 are expelled at a high velocity by a suitable gas which is passed through the inner tube 22. Particles of nickel 24 are heated within the reducing flame 23 which prevents them from being oxidized. When the hot particles 24 strike the surface 12 of workpiece 10, they adhere to it to form a thin coating of nickel.

As shown in FIG. 5A, the surface 12 of workpiece 10 may have a thin coating of metal such as nickel deposited on it by electroplating. Surface 12 of workpiece 10 and a nickel electrode 25 are immersed in a suitable electrolyte 28 within tank 27. When the electrode 25 and the workpiece 10 are connected to a suitable current source 26, a thin nickel film is plated on surface 12. Referring to FIG. 5B, the sandblasted surface 12 of workpiece 10 may have a thin film of nickel fixed to it with a mechanical bond or, a thin wafer of nickel may be first welded directly onto the surface of one of the workpieces thereby providing a new surface of nickel for friction welding onto the second workpiece. Also, a thin nickel foil or sheet 29 is pressed against the sandblasted surface 12 with a suitable tool 30. Whatever the method used, the film plate or sheet of nickel deposited on surface 12 of workpiece 10 should be between one to twenty-five millimeters in thickness.

Referring now to FIG. 1, the aluminum workpiece 11, which has had its surface 13 degreased, is rapidly rotated by a conventional friction welding apparatus. The stainless steel workpiece 10, which has had its degreased and sandblasted surface 12 covered with a thin film of nickel, is forced towards the rapidly rotating workpiece 11. As in a conventional friction welding process, when the surfaces 12 and 13 contact each other frictional heat is developed which rapidly melts the nickel film on surface 12. After a suitable interval of time has elapsed, and adequate heat develops, the rotation of workpiece 11 is rapidly stopped and the workpieces 10 and 11 are pressed together until they are welded as shown in FIG. 6.

Referring ow to FIG. 7, it may be seen that the aluminum of workpiece 11 becomes an aluminum nickel alloy 31 in the area of the weld while the mechanical bond between the nickel and the stainless steel becomes a weld as nickel diffuses into the stainless steel to form a nickel steel alloy 32. These nickel alloys 31 and 32 may be stronger than pure nickel and thus form a strong weld. In addition, lower pressures and temperatures are required so that pressure cracks or excessive upset are less likely to develop in the aluminum workpiece 11 in the weld area.

While the friction welding of stainless steel and aluminum has been shown and described, aluminum may be welded to any steel if the steel is coated with a thin layer of silver or nickel. In a like manner, stainless steel may be effectively welded to molybdenum using nickel or some other intermediary material and Monel may be friction welded to aluminum using nickel or copper as an intermediary material. Thus, by means of this welding process, metals which are not soluble in each other may be satisfactorily friction welded by placing a thin layer or wafer of mutually compatible material between the two workpieces. The thin layer of intermediate metal must be truly soluble in both the metals to be welded to be satisfactory. As shown in FIG. 7, an intermediary material may not necessarily remain in the weld area in a pure state when making a strong friction weld according to this invention but, in this example, only a relatively strong nickel aluminum alloy and a nickel steel alloy remain in the weld area.

If the intermediary material wets the surfaces of the two parent workpieces but remains as a thin film of its own composition between the workpieces after completion of the weld, the process may be described as friction brazing.

What is claimed is:

1. The process of friction welding a first and a second workpiece, each respectively of a first and second different metal, comprising the steps of forming a thin layer between the workpieces of a third different metal soluble in the metals of each of the workpieces, rapidly rotating said workpieces relative to each other, forcing the workpieces together against said third metal and rapidly stopping relative rotation of the workpieces while continuing to force the workpieces together and thus forming a weld in which the third metal is at least partially alloyed with each of the other metals.

2. The process according to claim 1 wherein a thin layer of metal, from one to 25 millimeters in thickness, which is soluble in each of the workpieces is formed on one workpiece.

3. The process according to claim 1 in which a thin metal layer is first friction welded onto the surface of the first workpiece and the workpieces are thereafter welded.

4. The process according to claim 1 in which the melting point of the thin layer of metal is intermediate those of the workpieces.

5. A method of bonding two dissimilar metals by friction heating followed by abrupt stopping of friction according to claim 1 characterized in that at least three different metals selected from the group consisting of aluminum, steel, stainless steel, molybdenum, zirconium, Monel, nickel, copper and silver are joined to one another serially by friction heating and that the third central metal is in the form of a thin layer soluble in each of the first and second lateral metals.

6. The process of friction welding a first and a second workpiece of mutually insoluble metals comprising the steps of degreasing a surface of the first workpiece, sandblasting a surface of the second workpiece, forming a film from one to twenty-five millimeters in thickness of a metal soluble in the metal of both workpieces on the sandblasted surface of the second workpiece, rapidly rotating the first workpiece, urging the sandblasted and film coated surface of the second workpiece against the degreased surface of the rotating first workpiece, and rapidly stopping the relative rotation of the workpieces while continuing to urge the workpieces together.

7. The process of friction welding a first and a second workpiece of mutually insoluble metals comprising the steps of degreasing a surface of the second workpiece, sandblasting a surface of the first workpiece, forming a film on the sandblasted surface of the first workpiece of a metal soluble in the metals of both workpieces, rapidly rotating the second workpiece, urging the sandblasted and film coated surface of the first workpiece against the degreased surface of the second workpiece, and rapidly stopping the relative rotation of the workpieces while continuing to urge the workpieces together forming a weld in which the metal of the film is completely alloyed with the metals of the workpieces.

8. The process according to claim 7 wherein the film of metal is formed on the first workpiece from one to twenty-five millimeters in thickness.

9. The process according to claim 8 in which a surface of the first workpiece is sandblasted with a material of from 15 to 25 grit size.

10. The process according to claim 9 wherein the first workpiece is of steel, the second workpiece is of aluminum, and the thin film of metal is of nickel.

11. The process according to claim 9 in which the first workpiece is of steel, the second workpiece is of aluminum, and the thin film of metal is formed of silver.

12. The process according to claim 9 in which the first workpiece is Monel, the second workpiece is aluminum, and the thin film is formed from nickel.

13. The process according to claim 9 wherein the first workpiece is of Monel, the second workpiece is of aluminum, and the thin film of metal is formed of copper.

14. The process of friction welding an aluminum and a stainless steel workpiece comprising the steps of degreasing a surface of the aluminum workpiece, degreasing a surface of the stainless steel workpiece, sandblasting the degreased surface of the stainless steel workpiece with a material from 15 to 25 grit size, forming a nickel coating from one to twenty-five millimeters in thickness on the sandblasted surface of the stainless steel workpiece, rapidly rotating the aluminum workpiece, forcing the sandblasted and film coated surface of the stainless steel workpiece against the degreased surface of the rotating aluminum workpiece, and rapidly stopping the relative rotation of the workpieces forming a friction weld with only aluminum nickel and nickel steel alloys in the weld area.

References Cited in the file of this patent

UNITED STATES PATENTS

| | | |
|---|---|---|
| 99,805 | Absterdam | Feb. 15, 1870 |
| 132,900 | Cooper | Nov. 12, 1872 |
| 2,094,483 | Weder | Sept. 28, 1937 |
| 2,354,267 | Lytle et al. | July 25, 1944 |
| 2,662,500 | Fort et al. | Dec. 15, 1953 |
| 2,798,843 | Slomin et al. | July 9, 1957 |

FOREIGN PATENTS

| | | |
|---|---|---|
| 572,789 | Great Britain | Oct. 24, 1945 |